(12) United States Patent
Narasimhan et al.

(10) Patent No.: US 8,238,496 B1
(45) Date of Patent: Aug. 7, 2012

(54) MULTIUSER MULTIPLE-INPUT MULTIPLE-OUTPUT (MU-MIMO) CHANNEL ESTIMATION FOR MULTICARRIER COMMUNICATIONS

(75) Inventors: Ravi Narasimhan, Los Altos, CA (US); Shi Cheng, Sunnyvale, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 262 days.

(21) Appl. No.: 12/782,066

(22) Filed: May 18, 2010

(51) Int. Cl.
- H03D 1/04 (2006.01)
- H03D 1/06 (2006.01)
- H03K 5/01 (2006.01)
- H03K 6/04 (2006.01)
- H04B 1/10 (2006.01)
- H04L 1/00 (2006.01)
- H04L 25/08 (2006.01)

(52) U.S. Cl. ........ 375/346; 375/260; 375/285; 375/348; 375/349; 375/231; 455/500; 455/501; 455/504; 455/296

(58) Field of Classification Search ................ 375/346, 375/260, 231, 284, 285, 348, 349; 455/500, 455/501, 504, 296
See application file for complete search history.

(56) References Cited

U.S. PATENT DOCUMENTS

| | | | |
|---|---|---|---|
| 7,327,812 B2* | 2/2008 | Auer | 375/347 |
| 7,912,115 B2* | 3/2011 | Zhao et al. | 375/219 |
| 2006/0270416 A1* | 11/2006 | Perets et al. | 455/452.2 |
| 2008/0032630 A1* | 2/2008 | Kim et al. | 455/45 |
| 2009/0196274 A1* | 8/2009 | Rimini et al. | 370/344 |
| 2010/0128683 A1* | 5/2010 | Zangi et al. | 370/329 |
| 2012/0014476 A1* | 1/2012 | Kuchi et al. | 375/296 |
| 2012/0020433 A1* | 1/2012 | Bhattad et al. | 375/296 |
| 2012/0021688 A1* | 1/2012 | Bhattad et al. | 455/63.1 |

OTHER PUBLICATIONS

Krim et al., "Two Decades of Array Signal Processing Research", IEEE Signal Processing Magazine, Jul. 1996, pp. 67-94.
Zhou et al., "Efficient Channel Estimation for LTE Uplink", IEEE.
Ziskind et al., "Maximum Likelihood Localization of Multiple Sources by Alternating Projection", IEEE Transactions on Acoustics, Speech, and Signal Processing, vol. 36, No. 10.

* cited by examiner

*Primary Examiner* — Phuong Phu
(74) *Attorney, Agent, or Firm* — Law Office of Gerald Maliszewski; Gerald Maliszewski

(57) ABSTRACT

Provided are a system and method of estimating channels for a plurality of multicarrier signals in a wireless receiver. A receiver accepts a plurality of multicarrier signals, transmitted simultaneously from a plurality of transmitters, with overlapping carrier frequencies and nominally orthogonal reference signals. For each multicarrier signal, a reference signal is recovered including a plurality of adjacent subcarrier frequencies carrying predetermined symbols. A channel estimate is found across the plurality of adjacent subcarrier frequencies, for each multicarrier signal channel, by compensating for a loss of orthogonality between reference signals, in response to assuming a linear phase rotation for each channel across the plurality of adjacent reference signal subcarriers, and a constant amplitude for each channel across the plurality of adjacent reference signal subcarriers. More explicitly, the assumption of linear phase rotation and constant amplitude permits a Direction of Arrival (DoA) algorithm to be used.

28 Claims, 4 Drawing Sheets

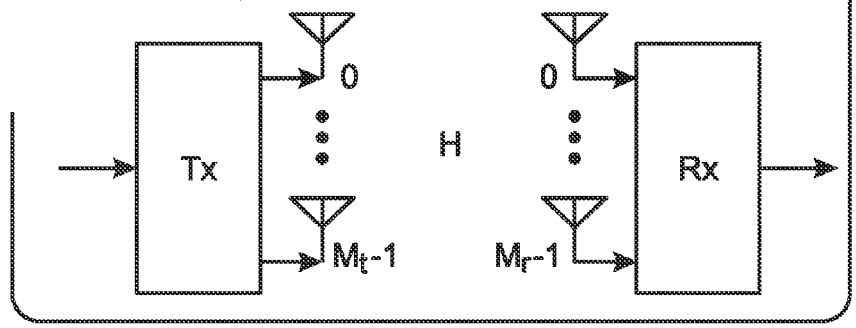
Fig. 1 *(PRIOR ART)*
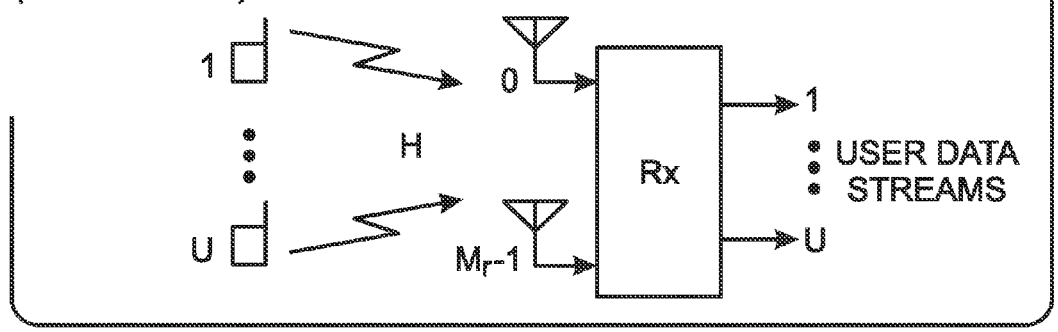
Fig. 2 *(PRIOR ART)*
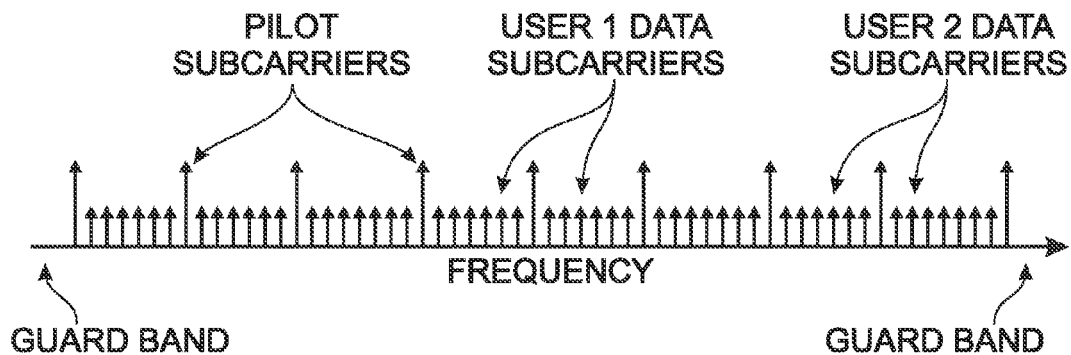
Fig. 4 *(PRIOR ART)*

MULTIUSER MULTIPLE-INPUT MULTIPLE-OUTPUT (MU-MIMO) CHANNEL ESTIMATION FOR MULTICARRIER COMMUNICATIONS

BACKGROUND OF THE INVENTION

1. Field of the Invention

This invention generally relates to Multiple-Input Multiple-Output (MIMO) Orthogonal Frequency Division Multiple Access (OFDMA) and Single Carrier Frequency Division Multiple Access (SC-FDMA) systems, and more particularly, to channel estimation for MU-MIMO systems where the different users' reference signals are multiplexed by applying orthogonal cyclic shifts.

2. Description of the Related Art

FIG. 1 is a diagram depicting a Single-User MIMO (SU-MIMO) wireless communication system (prior art). Multiple transmit (Tx) and receive (Rx) antennas are used to send multiple data streams in parallel at the same frequency. MIMO processing increases the data rates by up to a factor of min(Mt, Mr), as compared to single-antenna systems. Each receive antenna collects a linear combination of all Tx antenna signals, resulting in inter-stream interference. There is a need to decouple the spatial streams at the receiver. This decoupling is accomplished via MIMO equalization. MIMO equalization requires estimates of the channel matrix H, which is the gain and phase response between each Tx and Rx antenna pair at a particular time and frequency.

As noted in Wikipedia, MIMO can be sub-divided into three main categories, precoding, spatial multiplexing (SM), and diversity coding. Precoding is multi-layer beamforming in a narrow sense or all spatial processing at the transmitter in a wide-sense. In (single-layer) beamforming, the same signal is emitted from each of the transmit antennas with appropriate phase (and sometimes gain) weighting such that the signal power is maximized at the receiver input. The benefits of beamforming are to increase the signal gain from constructive combining and to reduce the multipath fading effect. In the absence of scattering, beamforming results in a well defined directional pattern, but in typical cellular conventional beams are not a good analogy. When the receiver has multiple antennas, the transmit beamforming cannot simultaneously maximize the signal level at all of the receive antennas, and precoding is used. Note that precoding requires knowledge of the channel state information (CSI) at the transmitter.

Spatial multiplexing requires MIMO antenna configuration. In spatial multiplexing, a high rate signal is split into multiple lower rate streams and each stream is transmitted from a different transmit antenna in the same frequency channel. If these signals arrive at the receiver antenna array with sufficiently different spatial signatures, the receiver can separate these streams, creating parallel channels free. Spatial multiplexing is a very powerful technique for increasing channel capacity at higher Signal to Noise Ratio (SNR). The maximum number of spatial streams is limited by the lesser in the number of antennas at the transmitter or receiver. Spatial multiplexing can be used with or without transmit channel knowledge.

Diversity Coding techniques are used when there is no channel knowledge at the transmitter. In diversity methods a single stream (unlike multiple streams in spatial multiplexing) is transmitted, but the signal is coded using techniques called space-time coding. The signal is emitted from each of the transmit antennas using certain principles of full or near orthogonal coding. Diversity exploits the independent fading in the multiple antenna links to enhance signal diversity. Because there is no channel knowledge, there is no beamforming or array gain from diversity coding. Spatial multiplexing can also be combined with precoding when the channel is known at the transmitter or combined with diversity coding when decoding reliability is in trade-off.

FIG. 2 is a diagram depicting a Multiuser MIMO (MU-MIMO) wireless communication system (prior art). Multiple users can transmit data simultaneously at the same frequency to a multi-antenna base station, resulting in increased aggregate cell throughput. There is a need to decouple data streams from different users via MU-MIMO equalization, which requires MU-MIMO channel estimation.

FIG. 3 is a diagram depicting a subframe consisting of two slots, as is used in Long Term Evolution (LTE) (prior art). LTE is the Third Generation Partnership Program (3GPP) term for the next generation cellular standard. The figure shows two resource blocks, with one resource block per slot. Each slot includes seven OFDMA or SC-FDMA symbols for normal CP, or 6 symbols for extended CP, at twelve subcarrier frequencies. In OFDMA and SC-FDMA, each user is allocated resource elements (REs) in time and frequency. SC-FDMA is similar to OFDMA except that user data are spread via a discrete Fourier transform (DFT) before OFDMA modulation. Each resource element consists of 1 subcarrier in the frequency domain and 1 OFDMA or SC-FDMA symbol in the time domain. User data modulates the amplitude and phase of each subcarrier for the duration of 1 OFDMA or SC-FDMA symbol. Multiple users can modulate the same RE (MU-MIMO). In the LTE uplink, each user transmits reference signals on all REs of specified symbols. Different user reference signals are multiplexed using different cyclic shifts. The base station uses the reference signals to estimate a channel for each user.

FIG. 4 is a diagram depicting an exemplary OFDMA frequency spectrum (prior art). OFDMA is a multi-user version of the popular Orthogonal frequency-division multiplexing (OFDM) digital modulation scheme. Multiple access is achieved in OFDMA by assigning subsets of subcarriers to individual users as shown. This allows simultaneous low data rate transmission from several users. OFDMA is recognized as being highly sensitive to frequency offsets and phase noise. OFDMA can also be described as a combination of frequency domain and time domain multiple access, where the resources are partitioned in the time-frequency space, and slots are assigned along the OFDM symbol index as well as OFDM sub-carrier index. OFDMA is considered as highly suitable for broadband wireless networks, due to advantages including scalability and MIMO-friendliness, and ability to take advantage of channel frequency selectivity.

SC-FDMA is a multi-user version of Single-carrier frequency-domain-equalization (SC-FDE) modulation scheme. SC-FDE can be viewed as a linearly precoded OFDM scheme, and SC-FDMA can be viewed as a linearly precoded OFDMA scheme, henceforth LP-OFDMA. FDE is the equalizer at receiver end. It is different from the modulation scheme. Or, it can be viewed as a single carrier multiple access scheme. Just like in OFDM, guard intervals with cyclic repetition are introduced between blocks of symbols in view to efficiently eliminate time spreading (caused by multi-path propagation) among the blocks. In OFDM, a Fast Fourier transform (FFT) is applied on the receiver side on each block of symbols, and inverse FFT (IFFT) on the transmitter side. In SC-FDMA, both FFT and IFFT are applied on the receiver side, but not on the transmitter side. In SC-FDMA, both FFT and IFFT are applied on the transmitter side, and also on the receiver side.

In OFDM as well as SC-FDE and SC-FDMA, equalization is achieved on the receiver side after the FFT calculation, by multiplying each Fourier coefficient by a complex number. Thus, frequency-selective fading and phase distortion can be combated. The advantage is that FFT and frequency domain equalization requires less computation power than conventional time-domain equalization. In SC-FDMA, multiple access is made possible by inserting zero Fourier-coefficients on the transmitter side before the IFFT, and removing them on the receiver side after the FFT. Different users are assigned to different Fourier-coefficients (subcarriers).

LTE uses OFDMA for the downlink—that is, from the base station to the terminal. In the time domain the radio frame is 10 ms long and consists of 10 sub frames of 1 ms each. In LTE with frequency-division duplexing (FDD), every sub frame consists of 2 slots where each slot is 0.5 ms. The subcarrier spacing in the frequency domain is 15 kHz and there are modes with 7.5 kHz subcarrier spacing. Twelve of these subcarriers together (per slot) are called a resource block, so one resource block is 180 kHz. 6 Resource blocks fit in a carrier of 1.4 MHz and 100 resource blocks fit in a carrier of 20 MHz. In the uplink, for the Physical Uplink Shared channel (PUSCH) only, LTE uses a pre-coded version of OFDMA called SC-FDMA to compensate for a drawback with normal OFDMA, which has a very high peak-to-average power ratio (PAPR). High PAPR requires expensive and inefficient power amplifiers with high requirements on linearity, which increases the cost of the terminal and drains the battery faster. SC-FDMA solves this problem by grouping together the resource blocks in a way that reduces the need for linearity, and so power consumption, in the power amplifier. A low PAPR also improves coverage and the cell-edge performance.

In MIMO systems, a transmitter sends multiple streams by multiple transmit antennas. The transmit streams go through a matrix channel which consists of all paths between the transmit antennas at the transmitter and receive antennas at the receiver. Then, the receiver gets the received signal vectors by the multiple receive antennas and decodes the received signal vectors into the original information. A narrowband flat fading MIMO system is modeled as:

$$y=Hx+n$$

where y and x are the receive and transmit vectors, respectively, and H and n are the channel matrix and the noise vector, respectively. Where x is a Mt×1 vector, y and n are Mr×1 vectors.

With respect to MU-MIMO channel estimation for OFDMA/SC-FDMA, user reference signals with different cyclic shifts are orthogonal across a number of tones in ideal scenarios (no timing offset and low delay spread). In this case, channel estimation for each user is decoupled. Several channel estimation techniques exist in prior art, such as least squares, minimum mean-square error (MMSE), discrete cosine transform (DCT), can be used under the orthogonality assumption. In practice, orthogonality is destroyed because of different user timing offsets and/or medium to high delay spreads.

FIG. 5 is a diagram depicting an exemplary MIMO receiver (prior art). Channel estimation is needed in multi-user and single-user MIMO receivers to separate different spatial streams and/or user signals via equalization. Of special interest is OFDMA and SC-FDMA multi-user MIMO channel estimation with a single spatial stream per user (e.g., LTE uplink). The input to the channel estimator block is the received frequency domain signal of reference symbols from Mr receive antennas. The outputs are channel responses in the frequency domain from user u ($1 \leq u \leq U$) to antenna m ($0 \leq m \leq Mr-1$).

FIG. 6 is a drawing depicting uplink reference signals in LTE (normal cyclic prefix) (prior art). The reference signals of the different users are orthogonal across a number of tones if the same base sequence is used and each user applies a unique cyclic shift. The orthogonality holds in the additive white Gaussian noise (AWGN) channel with no relative timing offset across users, but not in a multipath fading channel or with non-zero relative timing offsets across users. This is a problem because the user timing offsets are unknown to the receiver.

In signal processing, direction of arrival denotes the direction from which usually a propagating wave arrives at a point, where usually a set of sensors are located. This set of sensors forms what is called a sensor array. Often there is the associated technique of beamforming which is estimating the signal from a given direction. With beamforming, spatial selectivity is achieved by using adaptive or fixed receive/transmit beampatterns. The improvement compared with an omnidirectional reception/transmission is known as the receive/transmit gain (or loss). Beamforming takes advantage of interference to change the directionality of the array. When transmitting, a beamformer controls the phase and relative amplitude of the signal at each transmitter, in order to create a pattern of constructive and destructive interference in the wavefront. When receiving, information from different sensors is combined in such a way that the expected pattern of radiation is preferentially observed. With narrow-band systems the time delay is equivalent to a "phase shift", so in this case the array of antennas, each one shifted a slightly different amount, is called a phased array. A narrow band system is one where the bandwidth is only a small fraction of the centre frequency.

It would be advantageous if an approach existed for MU-MIMO channel estimation for OFDMA/SC-FDMA that accounted for non-orthogonal user reference signals.

SUMMARY OF THE INVENTION

Disclosed herein is an approach to Multiuser Multiple-Input Multiple-Output (MU-MIMO) channel estimation for Orthogonal Frequency Division Multiple Access/Single Carrier-Frequency Division Multiple Access (OFDMA/SC-FDMA) that accounts for non-orthogonal user reference signals. The problem of non-orthogonality is addressed by using direction-of-arrival (DoA) techniques to estimate user timing offsets. The timing offset estimates can then be used to obtain channel estimates for each user according to conventional least squares or regularized least squares methods. Since each user is subject to a different timing offset (TO), the orthogonality created by different cyclic shifts is no longer maintained. For a 2-user MIMO with small TO, this loss of orthogonality in a narrow bandwidth can be ignored to derive low-complexity MU-MIMO channel estimation. However, for a 3 or more user MIMO, the loss of orthogonality becomes a severe problem for channel estimation. In this case, each user's TO is first estimated by solving a direction-of-arrival (DoA) problem. Several DoA approaches are possible. In particular, a simplified projection method provides good performance with low complexity. The MU-MIMO channel estimate is obtained using estimates of the TOs for all users.

These enhanced channel estimates can be used to enable a MU-MIMO equalizer in a LTE eNodeB, such that lower packet error rates and higher throughputs can be achieved in the uplink. These enhanced channel estimates can be used in an eNodeB for both LTE Release 8 (current LTE) and the future LTE advanced standard (e.g., LTE Release 9 and beyond). The enhanced channel estimates can also be used in base stations or access points for Worldwide Interoperability for Microwave Access (Wimax), such as IEEE 802.16e and 802.16m, and future WiFi applications such as IEEE 802.11ac.

Accordingly, a method of estimating channels is provided for a plurality of multicarrier signals in a wireless receiver. A receiver accepts a plurality of multicarrier signals, transmitted simultaneously from a plurality of transmitters, with overlapping carrier frequencies and nominally orthogonal reference signals. For each multicarrier signal, a reference signal is recovered including a plurality of adjacent subcarrier frequencies carrying predetermined symbols. The loss of orthogonality between the reference signals, caused by propagation medium distortion errors, is compensated for by finding a channel estimate across the plurality of adjacent subcarrier frequencies for each multicarrier signal channel in response to assuming a linear phase rotation for each channel across the plurality of adjacent reference signal subcarriers, and a constant amplitude for each channel across the plurality of adjacent reference signal subcarriers. More explicitly, the assumption of linear phase rotation and constant amplitude permit the use of one of the following DoA algorithms: classic beamforming, Capon beamforming, MUSIC, ESPRIT, alternating projection, or simplified projection.

Additional details of the above-described method, and a wireless receiver with the capability of estimating channels for a plurality of multicarrier signals, are provided below.

BRIEF DESCRIPTION OF THE DRAWINGS

FIG. 1 is a diagram depicting a Single-User MIMO (SU-MIMO) wireless communication system (prior art).

FIG. 2 is a diagram depicting a Multiuser MIMO (MU-MIMO) wireless communication system (prior art).

FIG. 4 is a diagram depicting an exemplary OFDMA frequency spectrum (prior art).

DETAILED DESCRIPTION

Figure 7:
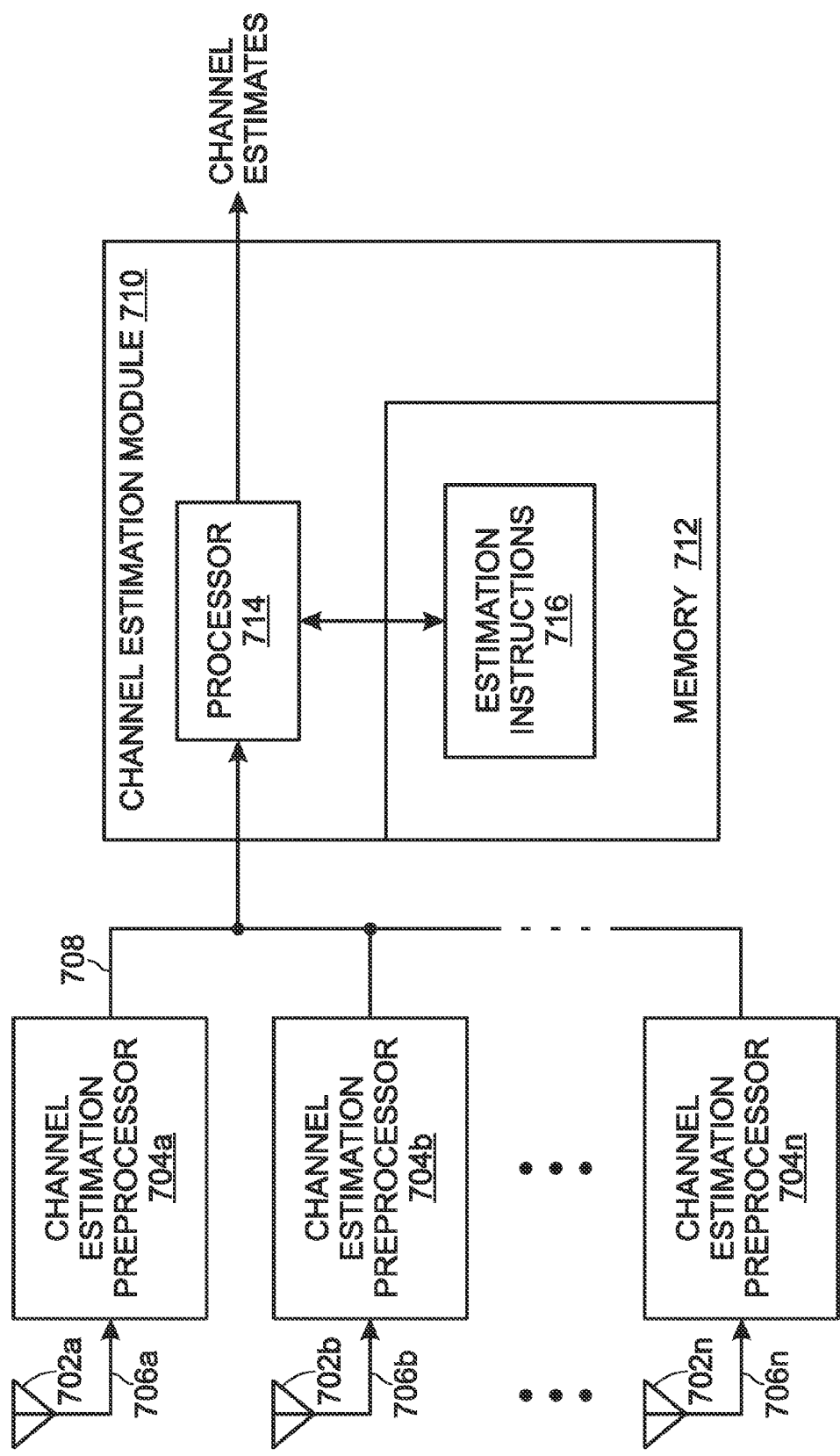
FIG. 7 is a schematic block diagram depicting a wireless receiver with a capability of estimating channels for a plurality of multicarrier signals.

FIG. 7 is a schematic block diagram depicting a wireless receiver with a capability of estimating channels for a plurality of multicarrier signals. The receiver 700 comprises a plurality of receive antennas 702 accepting a plurality of multicarrier signals, transmitted simultaneously from a plurality of transmitters (not shown). Note that the number of receive antennas need not be equal to the number of transmitted data streams. However, the number of receive antennas must be greater than or equal to the number of independent transmitted data streams. The multicarrier signals have overlapping carrier frequencies and nominally orthogonal reference signals including a plurality of adjacent subcarrier frequencies carrying predetermined symbols. Shown are antennas 702a through 702n, where n is a variable not limited to any particular value.

A plurality of channel estimation preprocessors, 704a through 704n, is shown. Each channel estimation preprocessor 704 has an input on line 706 to accept multicarrier signals from a corresponding antenna, and an output on line 708 to supply baseband multicarrier signals. A channel estimation preprocessor may include a subsystem to convert radio frequency (RF) signals to digital signals. After removal of the cyclic prefix (CP), a discrete Fourier transform (DFT) is performed. These principles are well understood in the art and are not presented in detail, in the interest of brevity. The antennas 702 may accept signals in an orthogonal frequency division multiple access (OFDMA), orthogonal frequency division multiplexing (OFDM), or single carrier-frequency division multiple access (SC-FDMA). In one aspect, the signals may be Multiuser Multiple-Input Multiple-Output (MU-MIMO) signals.

A channel estimation module 710 has an input connected to each channel estimation preprocessor output on line 708. In one aspect as shown, the channel estimation module 710 is enabled as a sequence of software instructions 716 stored in a computer readable memory 712 and executed by a processor 714. Alternately, the channel estimation module may be at least partially enabled in hardware using a state logic machine. The channel estimation module 710 finds a channel estimate across the plurality of adjacent subcarrier frequencies for each multicarrier signal channel by compensation for a loss of orthogonality between the reference signals caused as a result of propagation medium distortion errors. For example, the propagation medium distortion may be multipath fading or timing offsets.

As mentioned above, the purpose of multiple antennas is to increase data rates and/or range using the same occupied channel bandwidth and total transmit power as a single-antenna system. Every receive antenna receives a superposition of all transmit signals. Receiver circuitry is connected to each receive antenna to separate the transmitted signals (this is called spatial equalization). In order to separate the transmitted signals at the receiver, the coefficients of the superposition need to be estimated (this is called channel estimation). The channel estimate is a matrix that represents the gain and phase distortion by the medium from each transmit antenna to each receive antenna at a given subcarrier frequency and at a given OFDMA/SC-FDMA symbol period. The number of rows of the channel matrix is equal to the number of receiver antennas. The number of columns of the channel matrix is equal to the number of transmitter antennas.

Each channel estimate is found in response to assuming a linear phase rotation for each channel across the plurality of adjacent reference signal subcarriers, and a constant amplitude for each channel across the plurality of adjacent reference signal subcarriers. In one aspect, the channel estimation module applies the linear phase rotation and constant amplitude assumptions to every m-th subcarrier frequency, where m is an integer variable greater than, or equal to 2. Based upon these assumptions, the channel estimation module 710 can find channel estimates using Direction-of-Arrival (DoA) algorithm, such as classic beamforming, Capon beamforming, MUltiple SIgnal Classification (MUSIC), estimation of signal parameters via rotational invariance techniques (ESPRIT), alternating projection, or simplified projection algorithm.

In one aspect, the channel estimation module 710 recovers a reference signal where adjacent subcarriers are separated by a frequency of less than about 325 kilohertz. The subcarrier separation in LTE is 15 kilohertz (kHz) or 7.5 kHz. The subcarrier separation in WLAN 802.11n is 312.5 kHz, and the subcarrier separation in mobile WiMax 802.16e is 10.94 kHz. In another aspect, the channel estimation module recovers a reference signal with a coherence bandwidth of less than 20 megahertz for an indoor propagation medium, or less than 200 kilohertz for an outdoor propagation medium.

In one aspect, Mr number of antennas (e.g., n) accept the plurality of multicarrier signals, and the channel estimation module 710 uses the linear phase rotation and constant amplitude assumptions to find the channel estimate is equivalent to:

$$H_{k+p,u} \approx H_{k,u} e^{-jp\phi_u}, 0 \leq p \leq P-1$$

where H is a Mr×1 channel vector;

k is a subcarrier index;

p is the index of separation between subcarriers;

$\phi_u$ is the phase shift in channel response from subcarrier k to subcarrier k+1 (due to timing offset);

u is an index of accepted multicarrier signals; and,

P is the total number of adjacent subcarriers where the assumption of a channel having a linear phase rotation and constant amplitude holds.

The channel estimation module initially finds the channel estimate as follows:

$$[Z_k \ldots Z_{k+P-1}] = [H_{k,1} \ldots H_{k,U}] \begin{bmatrix} 1 & \ldots & e^{j(P-1)\theta_1} \\ \vdots & \ddots & \vdots \\ 1 & \ldots & e^{j(P-1)\theta_U} \end{bmatrix} + [\tilde{W}_k \ldots \tilde{W}_{k+P-1}]$$

wherein Z is a Mr×1 received reference signal vector, after removing pre-determined symbol values; and, $\tilde{W}$ is a Mr×1 vector of interference plus noise, where;

$$\theta_u = -\phi_u + 2\pi\Delta_u/N, 1 \leq u \leq U;$$

where $\Delta_u$ is a known cyclic shift in samples for received multicarrier signal u.

Then, the channel estimation module finds:

$$[\hat{H}_{k,1} \ldots \hat{H}_{k,U}] = [Z_k \ldots Z_{k+P-1}]\hat{A}_P^*(\hat{A}_P\hat{A}_P^* + \sigma^2 I)^{-1}$$

where $\hat{H}$ is a Mr×1 channel estimate vector;

$$A_P = \begin{bmatrix} 1 & \ldots & e^{j(P-1)\theta_1} \\ \vdots & \ddots & \vdots \\ 1 & \ldots & e^{j(P-1)\theta_U} \end{bmatrix};$$

is a U×P matrix containing the linear phase rotation across adjacent subcarriers;

$\hat{A}_P$ is an estimate of $A_P$;

$\sigma^2$= is a regularization parameter;

U is the number of simultaneously transmitted multicarrier signals; and, and I is the U×U identity matrix.

In one aspect, the channel estimation module uses a classic beamforming algorithm to find:

$$\tilde{Z} = \begin{bmatrix} Z_0 & \ldots & Z_{P-1} \\ Z_P & \ldots & Z_{2P-1} \\ & \ldots & \\ Z_{(N-1)P} & \ldots & Z_{NP-1} \end{bmatrix}$$

where NP is less than a total number of allocated subcarriers M;

computing metrics:

$$\lambda(\theta) = \|\tilde{Z}a^H(\theta)\|^2$$

$$a(\theta) = [1 \ldots e^{j(P-1)\theta}]$$

where a is the steering vector peak picking to estimate:

$$\hat{\phi}_u = \arg\max_{\phi \in [\phi_{min}, \phi_{max}]} \lambda(2\pi\Delta_u/N - \phi);$$

where $\Delta_u$ is a known cyclic shift in samples for each multicarrier signal u.

In another aspect, the channel estimation module 710 uses an alternate projection algorithm to find:

$$\tilde{Z} = \begin{bmatrix} Z_0 & \ldots & Z_{P-1} \\ Z_P & \ldots & Z_{2P-1} \\ & \ldots & \\ Z_{(N-1)P} & \ldots & Z_{NP-1} \end{bmatrix};$$

where NP is less than a total number of allocated subcarriers M and P>U;

for each multicarrier signal, setting initial estimates $\hat{\theta}_u = \hat{\theta}_u^{(0)}$, and iteratively updating the estimates according to $\hat{\theta}_u = 2\pi\Delta_u/N - \hat{\phi}_u$;

where $\Delta_u$ is a known cyclic shift in samples for each multicarrier signal;

where $$\hat{\phi}_u = \arg\max_{\phi \in [\phi_{min}, \phi_{max}]} \lambda_u(2\pi\Delta_u/N - \phi);$$

where $\lambda_u()$ is determined by computing a projection matrix $$P_u = I - A_u^H(A_u A_u^H)^{-1} A_u;$$

where $$A_u = [a^H(\hat{\theta}_1), \ldots, a^H(\hat{\theta}_{u-1}), a^H(\hat{\theta}_{u+1}), \ldots, a^H(\hat{\theta}_U)]^H;$$

projecting and normalizing a steering vector $$b_u(\theta) = \frac{a(\theta)P_u}{\|a(\theta)P_u\|};$$

computing $\lambda_u(\theta) = \|\tilde{Z}b_u^H(\theta)\|^2$, and updating $\hat{\theta}_u$; and, repeating the above steps until a stopping criteria is met.

In another variation, the channel estimation module 710 uses a simplified projection algorithm to find:

$$\tilde{Z} = \begin{bmatrix} Z_0 & \ldots & Z_{P-1} \\ Z_P & \ldots & Z_{2P-1} \\ & \ldots & \\ Z_{(N-1)P} & \ldots & Z_{NP-1} \end{bmatrix}$$

where NP is less than a total number of allocated subcarriers M and P>U;

setting initial estimates $\hat{\theta}_u = \hat{\theta}_u^{(0)}$ for each multicarrier signal;

for each multicarrier signal, using a projection method to estimate $\hat{\theta}_u$, from the initial estimates, where the steering vector is given by:

$$b_u(\theta) = \frac{a(\theta)P_u}{\|a(\theta)P_u\|};$$

and,
where $$P_u = I - A_u^H (A_u A_u^H)^{-1} A_u;$$

and, $$A_u = [a^H(\hat{\theta}_1), \ldots, a^H(\hat{\theta}_{u-1}), a^H(\hat{\theta}_{u+1}), \ldots, a^H(\hat{\theta}_U)]^H.$$

Functional Description

To estimate the channel responses from users multiplexed on the LTE sounding reference signal (SRS), a DoA approach can be used since users are multiplexed through different cyclic shifts. One difference between sounding reference signals (SRS) and demodulation reference signals (DM-RS) is that SRS users transmit on every other subcarrier across at least 4 RBs. An SRS comb is defined as the set of even or odd subcarrier indices. There may be up to 8 users multiplexed per SRS comb.

Figure 3:
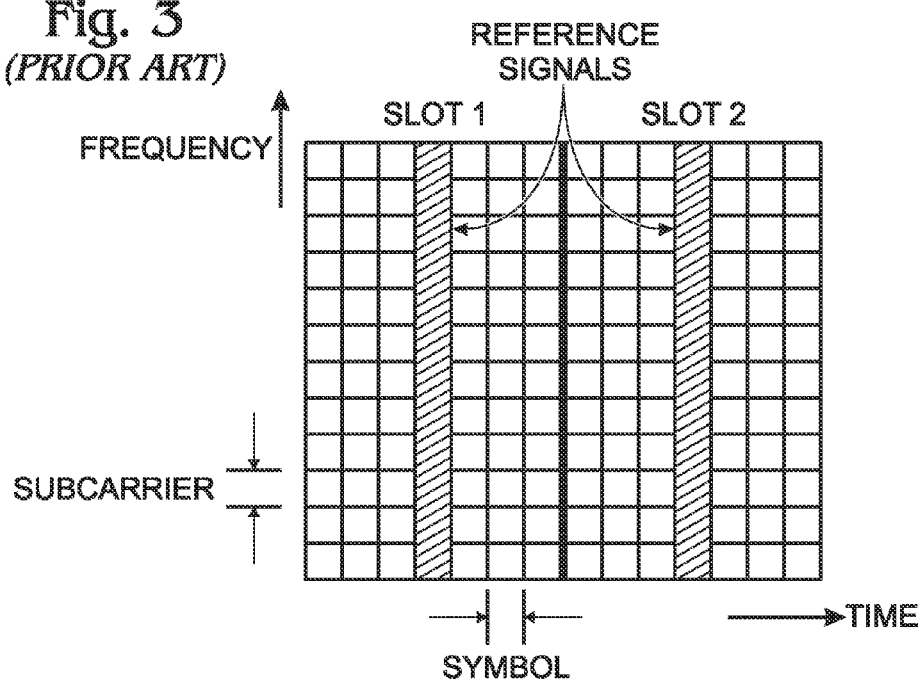
FIG. 3 is a diagram depicting a subframe consisting of two slots, as is used in Long Term Evolution (LTE) (prior art).
Figure 6:
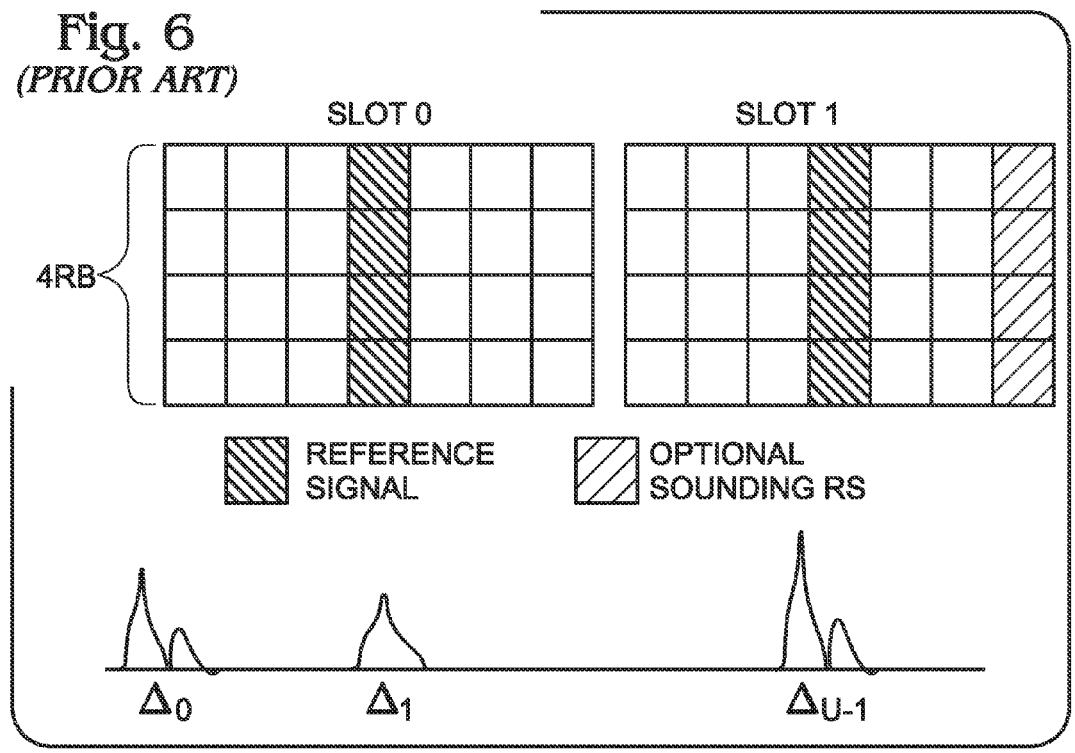
FIG. 6 is a drawing depicting uplink reference signals in LTE (normal cyclic prefix) (prior art).
Figure 5:
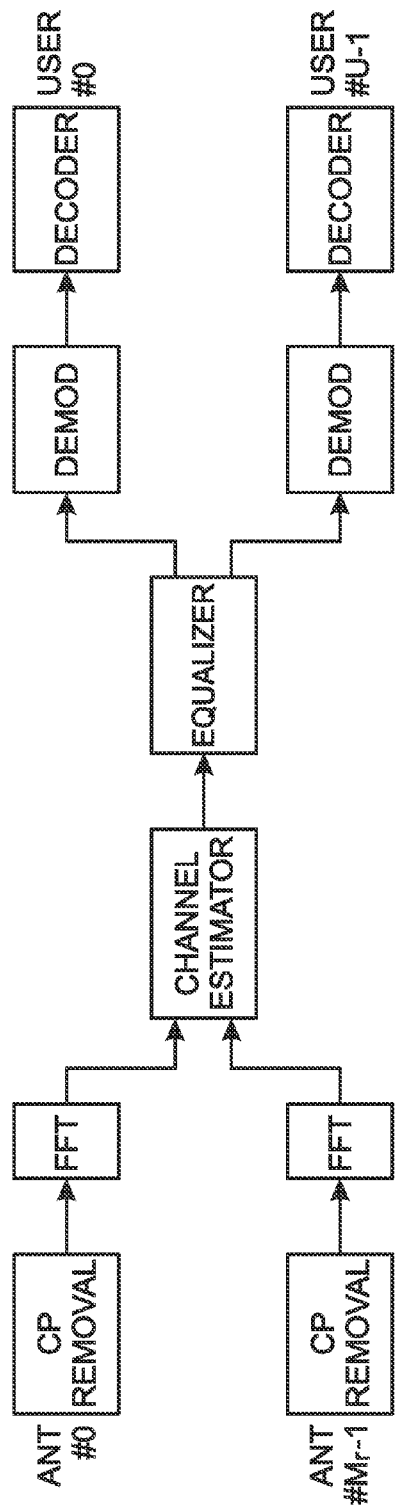
FIG. 5 is a diagram depicting an exemplary MIMO receiver (prior art).
Figure 8:
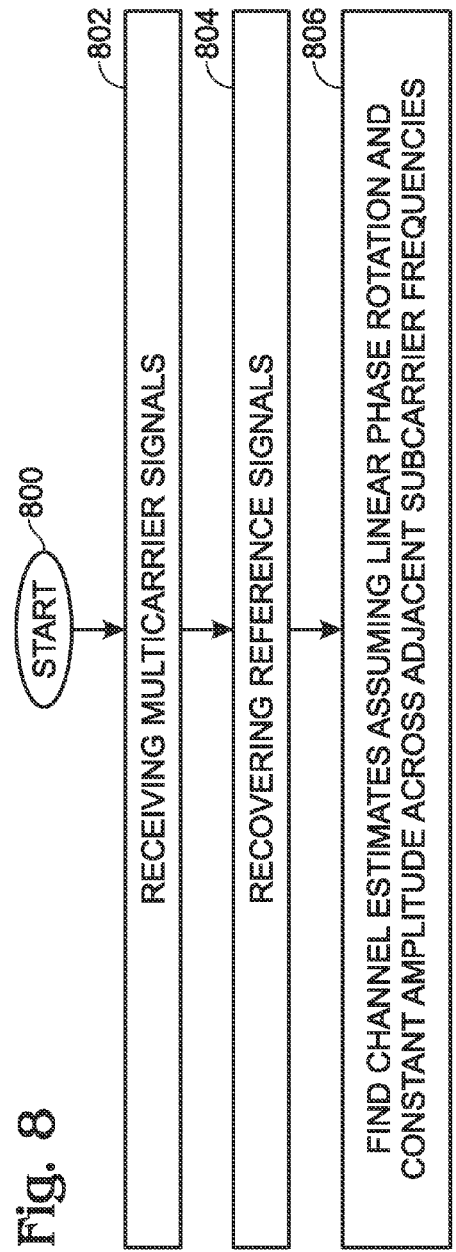
FIG. 8 is a flowchart illustrating a method of estimating channels for a plurality of multicarrier signals in a wireless receiver.

FIG. 8 is a flowchart illustrating a method of estimating channels for a plurality of multicarrier signals in a wireless receiver. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the steps are performed in numerical order. The method starts at Step 800.

In Step 802 a receiver accepts a plurality of multicarrier signals, transmitted simultaneously from a plurality of transmitters, with overlapping carrier frequencies and nominally orthogonal reference signals. For example, the signals may be OFDMA, OFDM, or SC-FDMA. In another aspect, the multicarrier signals are MU-MIMO signals. For each multicarrier signal, Step 804 recovers a reference signal including a plurality of adjacent subcarrier frequencies carrying predetermined symbols. The reference signal may have adjacent subcarriers separated by a frequency of less than about 325 kilohertz. In another aspect, the reference signal may have a coherence bandwidth of less than 20 megahertz for an indoor propagation medium, or less than 200 kilohertz for an outdoor propagation medium.

Step 806 finds a channel estimate across the plurality of adjacent subcarrier frequencies for each multicarrier signal channel by compensating for a loss of orthogonality between the reference signals caused by propagation medium distortion errors. The propagation medium distortion errors may be, for example, multipath fading or timing offsets. The channel estimate is found in response to assuming a linear phase rotation for each channel across the plurality of adjacent reference signal subcarriers, and a constant amplitude for each channel across the plurality of adjacent reference signal subcarriers. In one aspect, the assumptions of linear phase rotation and constant amplitude across adjacent reference signal subcarriers includes applying the assumptions to every mth subcarrier frequency, where m is an integer variable greater than, or equal to 2.

The assumption of linear phase rotation and constant amplitude permit the channel estimate to be found using one of the following DoA algorithms: classic beamforming, Capon beamforming, MUSIC, ESPRIT, alternating projection, or simplified projection.

In one aspect, accepting the plurality of multicarrier signals (Step 802) includes accepting the plurality of multicarrier signals via Mr number of receive antennas. Then, Step 806 assumes the linear phase rotation and constant amplitude to find the channel estimate is equivalent to:

$$H_{k+p,u} \approx H_{k,u} e^{-jp\phi_u}, 0 \leq p \leq P-1$$

where H is a Mr×1 channel vector;
k is a subcarrier index;
p is the index of separation between subcarriers;
$\phi_u$ is the phase shift in channel response from subcarrier k to subcarrier k+1 (due to timing offset);
u is an index of accepted multicarrier signals; and,
P is the total number of adjacent subcarriers where the assumption of a channel having a linear phase rotation and constant amplitude holds.

In one aspect, Step 806 finds:

$$[Z_k \ldots Z_{k+P-1}] = [H_{k,1} \ldots H_{k,U}] \begin{bmatrix} 1 & \ldots & e^{j(P-1)\theta_1} \\ \vdots & \ddots & \vdots \\ 1 & \ldots & e^{j(P-1)\theta_U} \end{bmatrix} + [\tilde{W}_k \ldots \tilde{W}_{k+P-1}]$$

wherein Z is a Mr×1 received reference signal vector, after removing pre-determined symbol values; and,
$\tilde{W}$ is a Mr×1 vector of interference plus noise, where;

$$\theta_u = -\phi_u + 2\pi\Delta_u/N, 1 \leq u \leq U;$$

where $\Delta_u$ is a known cyclic shift in samples for received multicarrier signal u.

More explicitly, Step 806 finds:

$$[\hat{H}_{k,1} \ldots \hat{H}_{k,U}] = [Z_k \ldots Z_{k+P-1}] \hat{A}_P^* (\hat{A}_P \hat{A}_P^* + \sigma^2 I)^{-1}$$

where $\hat{H}$ is a Mr×1 channel estimate vector;

$$A_P = \begin{bmatrix} 1 & \ldots & e^{j(P-1)\theta_1} \\ \vdots & \ddots & \vdots \\ 1 & \ldots & e^{j(P-1)\theta_U} \end{bmatrix};$$

is a U×P matrix containing the linear phase rotation across adjacent subcarriers;
$\hat{A}_P$ is an estimate of $A_P$;
$\sigma^2$ = is a regularization parameter;
U is the number of simultaneously transmitted multicarrier signals; and,
and I is the U×U identity matrix.

In one aspect, Step 806 uses a classic beamforming algorithm by forming:

$$\tilde{Z} = \begin{bmatrix} Z_0 & \ldots & Z_{P-1} \\ Z_P & \ldots & Z_{2P-1} \\ & \ldots & \\ Z_{(N-1)P} & \ldots & Z_{NP-1} \end{bmatrix}$$

where NP is less than a total number of allocated subcarriers M;
computing metrics:

$$\lambda(\theta) = \|\tilde{Z} a^H(\theta)\|^2$$

$$a(\theta) = [1 \ldots e^{j(P-1)\theta}]$$

where a is the steering vector
peak picking to estimate:

$$\hat{\phi}_u = \arg\max_{\phi \in [\phi_{min}, \phi_{max}]} \lambda(2\pi\Delta_u/N - \phi);$$

where $\Delta_u$ is a known cyclic shift in samples for each multicarrier signal u.

In another aspect, Step 806 finds the channel estimate using an alternate projection algorithm by forming:

$$\tilde{Z} = \begin{bmatrix} Z_0 & \ldots & Z_{P-1} \\ Z_P & \ldots & Z_{2P-1} \\ & \ldots & \\ Z_{(N-1)P} & \ldots & Z_{NP-1} \end{bmatrix};$$

where NP is less than a total number of allocated subcarriers M and P>U;
for each multicarrier signal, setting initial estimates $\hat{\theta}_u = \hat{\theta}_u^{(O)}$, and iteratively updating the estimates according to $\hat{\theta}_u = 2\pi\Delta_u/N - \hat{\phi}_u$;
where $\Delta_u$ is a known cyclic shift in samples for each multicarrier signal;
where $$\hat{\phi}_u = \arg\max_{\phi \in [\phi_{min}, \phi_{max}]} \lambda_u(2\pi\Delta_u/N - \phi);$$

where $\lambda_u(\ )$ is determined by computing a projection matrix $$P_u = I - A_u^H(A_u A_u^H)^{-1} A_u;$$

where $$A_u = [a^H(\hat{\theta}_1), \ldots, a^H(\hat{\theta}_{u-1}), a^H(\hat{\theta}_{u+1}), \ldots, a^H(\hat{\theta}_U)]^H;$$

projecting and normalizing a steering vector $$b_u(\theta) = \frac{a(\theta) P_u}{\|a(\theta) P_u\|};$$

computing $\lambda_u(\theta) = \|\tilde{Z} b_u^H(\theta)\|^2$, and updating $\hat{\theta}_u$; and,
repeating the above steps until a stopping criteria is met.

In a different aspect, Step 806 finds the channel estimate using a simplified projection algorithm by forming:

$$\tilde{Z} = \begin{bmatrix} Z_0 & \ldots & Z_{P-1} \\ Z_P & \ldots & Z_{2P-1} \\ & \ldots & \\ Z_{(N-1)P} & \ldots & Z_{NP-1} \end{bmatrix}$$

where NP is less than a total number of allocated subcarriers M and P>U;
setting initial estimates $\hat{\theta}_u = \hat{\theta}_u^{(O)}$ for each multicarrier signal;
for each multicarrier signal, using a projection method to estimate $\hat{\theta}_u$, from the initial estimates, where the steering vector is given by:

$$b_u(\theta) = \frac{a(\theta) P_u}{\|a(\theta) P_u\|};$$

and,
where $$P_u = I - A_u^H (A_u A_u^H)^{-1} A_u;$$

and, $$A_u = [a^H(\hat{\theta}_1), \ldots, a^H(\hat{\theta}_{u-1}), a^H(\hat{\theta}_{u+1}), \ldots, a^H(\hat{\theta}_U)]^H.$$

A system and method have been provided for finding multicarrier signal channel estimates in a transmission medium subject to multipath fading and timing offset errors. Particular mathematical formulas and DoA algorithms have been presented as examples to illustrate the invention. But the invention is not limited to just these examples. Other variations and embodiments of the invention will occur to those skilled in the art.

We claim:

1. In a wireless receiver, a method of estimating channels for a plurality of multicarrier signals, the method comprising;
   a receiver accepting a plurality of multicarrier signals, transmitted simultaneously from a plurality of transmitters, with overlapping carrier frequencies and nominally orthogonal reference signals;
   for each multicarrier signal, recovering a reference signal including a plurality of adjacent subcarrier frequencies carrying predetermined symbols;
   finding a channel estimate across the plurality of adjacent subcarrier frequencies for each multicarrier signal channel by compensating for a loss of orthogonality between the reference signals, caused by propagation medium distortion errors, in response to assuming:
   a linear phase rotation for each channel across the plurality of adjacent reference signal subcarriers; and,
   a constant amplitude for each channel across the plurality of adjacent reference signal subcarriers.

2. The method of claim 1 wherein accepting the plurality of multicarrier signals includes receiving signals in a protocol selected from a group consisting of orthogonal frequency division multiple access (OFDMA), orthogonal frequency division multiplexing (OFDM), and single carrier-frequency division multiple access (SC-FDMA).

3. The method of claim 2 wherein accepting the plurality of multicarrier signals includes accepting Multiuser Multiple-Input Multiple-Output (MU-MIMO) signals.

4. The method of claim 1 wherein recovering the reference signal includes recovering a reference signal where adjacent subcarriers are separated by a frequency of less than about 325 kilohertz.

5. The method of claim 4 wherein recovering the reference signal includes recovering a reference signal with a coherence bandwidth selected from a group consisting of less than 20 megahertz for an indoor propagation medium and less than 200 kilohertz for an outdoor propagation medium.

6. The method of claim 4 wherein finding the channel estimate assuming linear phase rotation and constant amplitude includes finding the channel estimate using an algorithm selected from a group consisting of classic beamforming, Capon beamforming, MUltiple SIgnal Classification (MUSIC), estimation of signal parameters via rotational invariance techniques (ESPRIT), alternating projection, and simplified projection.

7. The method of claim 5 wherein accepting the plurality of multicarrier signals includes accepting the plurality of multicarrier signals via Mr number of receive antennas;

wherein assuming the linear phase rotation and constant amplitude to find the channel estimate is equivalent to:

$$H_{k+p,u} \approx H_{k,u} e^{-jp\phi_u}, 0 \leq p \leq P-1$$

where H is a Mr×1 channel vector;
k is a subcarrier index;
p is the index of separation between subcarriers;
$\phi_u$ is the phase shift in channel response from subcarrier k to subcarrier k+1 (due to timing offset);
u is an index of accepted multicarrier signals; and,
P is the total number of adjacent subcarriers where the assumption of a channel having a linear phase rotation and constant amplitude holds.

8. The method of claim 7 wherein finding the channel estimate includes finding:

$$[Z_k \ldots Z_{k+P-1}] = [H_{k,1} \ldots H_{k,U}] \begin{bmatrix} 1 & \ldots & e^{j(P-1)\theta_1} \\ \vdots & \ddots & \vdots \\ 1 & \ldots & e^{j(P-1)\theta_U} \end{bmatrix} + [\tilde{W}_k \ldots \tilde{W}_{k+P-1}]$$

wherein Z is a Mr×1 received reference signal vector, after removing pre-determined symbol values; and,
$\tilde{W}$ is a Mr×1 vector of interference plus noise, where;

$$\theta_u = -\phi_u + 2\pi\Delta_u/N, 1 \leq u \leq U;$$

where $\Delta_u$ is a known cyclic shift in samples for received multicarrier signal u and $\phi_u$ is the phase shift in channel response from subcarrier k to subcarrier k+1 (due to timing offset).

9. The method of claim 8 wherein finding the channel estimate includes finding:

$$[\hat{H}_{k,1} \ldots \hat{H}_{k,U}] = [Z_k \ldots Z_{k+P-1}]\hat{A}^*_P(\hat{A}_P\hat{A}^*_P + \sigma^2 I)^{-1}$$

where $\hat{H}$ is a Mr×1 channel estimate vector;

$$A_P = \begin{bmatrix} 1 & \ldots & e^{j(P-1)\theta_1} \\ \vdots & \ddots & \vdots \\ 1 & \ldots & e^{j(P-1)\theta_U} \end{bmatrix};$$

is a U×P matrix containing the linear phase rotation across adjacent subcarriers;
$\hat{A}_P$ is an estimate of $A_P$;
$\sigma^2$ is a regularization parameter;
U is the number of simultaneously transmitted multicarrier signals; and,
and I is the U×U identity matrix.

10. The method of claim 1 wherein accepting the plurality of multicarrier signals subject to propagation medium distortion errors includes accepting multicarrier signals subject to propagation medium distortion selected from a group consisting of multipath fading and timing offsets.

11. The method of claim 8 wherein finding the channel estimate includes using a classic beamforming algorithm by forming:

$$\tilde{Z} = \begin{bmatrix} Z_0 & \ldots & Z_{P-1} \\ Z_P & \ldots & Z_{2P-1} \\ & \ldots & \\ Z_{(N-1)P} & \ldots & Z_{NP-1} \end{bmatrix}$$

where NP is less than a total number of allocated subcarriers M;
computing metrics:

$$\lambda(\theta) = \|\tilde{Z}a^H(\theta)\|^2$$

$$a(\theta) = [1 \ldots e^{j(P-1)\theta}]$$

where a is the steering vector
peak picking to estimate:

$$\hat{\phi}_u = \arg\max_{\phi \in [\phi_{min}, \phi_{max}]} \lambda(2\pi\Delta_u/N - \phi);$$

where $\Delta_u$ is a known cyclic shift in samples for each multicarrier signal u.

12. The method of claim 8 wherein finding the channel estimate includes using an alternate projection algorithm by forming:

$$\tilde{Z} = \begin{bmatrix} Z_0 & \ldots & Z_{P-1} \\ Z_P & \ldots & Z_{2P-1} \\ & \ldots & \\ Z_{(N-1)P} & \ldots & Z_{NP-1} \end{bmatrix};$$

where NP is less than a total number of allocated subcarriers M and P>U;
for each multicarrier signal, setting initial estimates
$\hat{\theta}_u = \hat{\theta}_u^{(0)}$, and iteratively updating the estimates according to $\hat{\theta}_u = 2\pi\Delta_u/N - \hat{\phi}_u$;
where $\Delta_u$ is a known cyclic shift in samples for each multicarrier signal;
where $$\hat{\phi}_u = \arg\max_{\phi \in [\phi_{min}, \phi_{max}]} \lambda_u(2\pi\Delta_u/N; -\phi)$$

where $\lambda_u()$ is determined by computing a projection matrix $$P_u = I - A_u^H(A_u A_u^H)^{-1} A_u;$$

where $$A_u = [a^H(\hat{\theta}_1), \ldots, a^H(\hat{\theta}_{u-1}), a^H(\hat{\theta}_{u+1}), \ldots, a^H(\hat{\theta}_U)]^H;$$

projecting and normalizing a steering vector $$b_u(\theta) = \frac{a(\theta)P_u}{\|a(\theta)P_u\|};$$

computing $\lambda^u(\theta) = \|\tilde{Z}b_u{}^H(\theta)\|^2$, and updating $\hat{\theta}_u$; and,
repeating the above steps until a stopping criteria is met.

13. The method of claim 8 wherein finding the channel estimate includes using a simplified projection algorithm by forming:

$$\tilde{Z} = \begin{bmatrix} Z_0 & \ldots & Z_{P-1} \\ Z_P & \ldots & Z_{2P-1} \\ & \ldots & \\ Z_{(N-1)P} & \ldots & Z_{NP-1} \end{bmatrix}$$

where NP is less than a total number of allocated subcarriers M and P>U;
setting initial estimates $\hat{\theta}_u = \hat{\theta}_u{}^{(0)}$ for each multicarrier signal;
for each multicarrier signal, using a projection method to estimate $\hat{\theta}_u$ from the initial estimates, where the steering vector is given by:

$$b_u(\theta) = \frac{a(\theta)P_u}{\|a(\theta)P_u\|}; \text{ and,}$$

where $$P_u = I - A_u{}^H(A_u A_u{}^H)^{-1}A_u;$$

and, $$A_u = [a^H(\hat{\theta}_1), \ldots, a^H(\hat{\theta}_{u-1}), a^H(\hat{\theta}_{u+1}), \ldots, a^H(\hat{\theta}_U)]^H.$$

14. The method of claim 1 wherein the assumptions of linear phase rotation and constant amplitude across adjacent reference signal subcarriers includes applying the assumptions to every m-th subcarrier frequency, where m is an integer variable greater than, or equal to 2.

15. A wireless receiver with a capability of estimating channels for a plurality of multicarrier signals, the receiver comprising:
a plurality of receive antennas accepting a plurality of multicarrier signals, transmitted simultaneously from a plurality of transmitters, with overlapping carrier frequencies and nominally orthogonal reference signals including a plurality of adjacent subcarrier frequencies carrying predetermined symbols;
a plurality of channel estimation preprocessors, each channel estimation preprocessor having an input to accept multicarrier signals from a corresponding antenna, and an output to supply baseband multicarrier signals;
a channel estimation module having an input connected to each channel estimation preprocessor output, the channel estimation module finding a channel estimate across the plurality of adjacent subcarrier frequencies for each multicarrier signal channel by compensating for a loss of orthogonality between the reference signals, caused as a result of propagation medium distortion errors, in response to assuming:
a linear phase rotation for each channel across the plurality of adjacent reference signal subcarriers; and,
a constant amplitude for each channel across the plurality of adjacent reference signal subcarriers.

16. The receiver of claim 15 wherein the antennas accept signals in a protocol selected from a group consisting of orthogonal frequency division multiple access (OFDMA), orthogonal frequency division multiplexing (OFDM), and single carrier-frequency division multiple access (SC-FDMA).

17. The receiver of claim 16 wherein the antennas accept Multiuser Multiple-Input Multiple-Output (MU-MIMO) signals.

18. The receiver of claim 15 wherein the channel estimation module recovers a reference signal where adjacent subcarriers are separated by a frequency of less than about 325 kilohertz.

19. The receiver of claim 18 wherein the channel estimation module recovers a reference signal with a coherence bandwidth selected from a group consisting of less than 20 megahertz for an indoor propagation medium and less than 200 kilohertz for an outdoor propagation medium.

20. The receiver of claim 18 wherein the channel estimation module uses linear phase rotation and constant amplitude assumptions to find channel estimates using an algorithm selected from a group consisting of classic beamforming, Capon beamforming, MUltiple SIgnal Classification (MUSIC), estimation of signal parameters via rotational invariance techniques (ESPRIT), alternating projection, and simplified projection.

21. The receiver of claim 19 wherein Mr number of antennas accept the plurality of multicarrier signals;
wherein the channel estimation module uses the linear phase rotation and constant amplitude assumptions to find the channel estimate is equivalent to:

$$H_{k+p,u} \approx H_{k,u} e^{-jp\phi_u}, 0 \leq p \leq P-1$$

where is a Mr×1 channel vector;
k is a subcarrier index;
p is the index of separation between subcarriers;
$\phi_u$ is the phase shift in channel response from subcarrier k to subcarrier k+1 (due to timing offset);
u is an index of accepted multicarrier signals; and,
P is the total number of adjacent subcarriers where the assumption of a channel having a linear phase rotation and constant amplitude holds.

22. The receiver of claim 21 wherein the channel estimation module finds the channel estimate as follows:

$$[Z_k \ldots Z_{k+P-1}] = [H_{k,1} \ldots H_{k,U}] \begin{bmatrix} 1 & \ldots & e^{j(P-1)\theta_1} \\ \vdots & \ddots & \vdots \\ 1 & \ldots & e^{j(P-1)\theta_U} \end{bmatrix} + [\tilde{W}_k \ldots \tilde{W}_{k+P-1}]$$

wherein Z is a Mr×1 received reference signal vector, after removing pre-determined symbol values; and,
$\tilde{W}$ is a Mr×1 vector of interference plus noise, where;

$$\theta_u = -\phi_u + 2\pi\Delta_u/N, 1 \leq u \leq U;$$

where $\Delta_u$ is a known cyclic shift in samples for received multicarrier signal u and $\phi_u$ is the phase shift in channel response from subcarrier k to subcarrier k+1 (due to timing offset).

23. The receiver of claim 22 wherein the channel estimation module finds the channel estimate as follows:

$$[\hat{H}_{k,1} \ldots \hat{H}_{k,U}] = [Z_k \ldots Z_{k+P-1}]\hat{A}^*_P(\hat{A}_P\hat{A}^*_P + \sigma^2 I)^{-1}$$

where $\hat{H}$ is a Mr×1 channel estimate vector;

$$A_P = \begin{bmatrix} 1 & \cdots & e^{j(P-1)\theta_1} \\ \vdots & \ddots & \vdots \\ 1 & \cdots & e^{j(P-1)\theta_U} \end{bmatrix};$$

is a U×P matrix containing the linear phase rotation across adjacent subcarriers;

$\hat{A}_P$ is an estimate of $A_P$;

$\sigma^2$=is a regularization parameter;

U is the number of simultaneously transmitted multicarrier signals; and, and I is the U×U identity matrix.

24. The receiver of claim 15 wherein the antennas accept multicarrier signals subject to propagation medium distortion selected from a group consisting of multipath fading and timing offsets.

25. The receiver of claim 22 wherein the channel estimation module uses a classic beamforming algorithm to find:

$$\tilde{Z} = \begin{bmatrix} Z_0 & \cdots & Z_{P-1} \\ Z_P & \cdots & Z_{2P-1} \\ & \cdots & \\ Z_{(N-1)P} & \cdots & Z_{NP-1} \end{bmatrix}$$

where NP is less than a total number of allocated subcarriers M;

computing metrics:

$\lambda(\theta) = \|\tilde{Z}a^H(\theta)\|^2$ $a(\theta) = [1 \ldots e^{j(P-1)\theta}]$ where a is the steering vector
peak picking to estimate:

$$\hat{\phi}_u = \arg\max_{\phi \in [\phi_{min}, \phi_{max}]} \lambda(2\pi\Delta_u/N - \phi);$$

where $\Delta_u$ is a known cyclic shift in samples for each multicarrier signal u.

26. The receiver of claim 22 wherein the channel estimation module uses an alternate projection algorithm to find:

$$\tilde{Z} = \begin{bmatrix} Z_0 & \cdots & Z_{P-1} \\ Z_P & \cdots & Z_{2P-1} \\ & \cdots & \\ Z_{(N-1)P} & \cdots & Z_{NP-1} \end{bmatrix}$$

where NP is less than a total number of allocated subcarriers M and P>U;

for each multicarrier signal, setting initial estimates $\hat{\theta}_u = \hat{\theta}_u^{(0)}$, and iteratively updating the estimates according to $\hat{\theta}_u = 2\pi\Delta_u/N - \hat{\phi}_u$;

where $\Delta_u$ is a known cyclic shift in samples for each multicarrier signal;

where $$\hat{\phi}_u = \arg\max_{\phi \in [\phi_{min}, \phi_{max}]} \lambda_u(2\pi\Delta_u/N; -\phi)$$

where $\lambda_u()$ is determined by computing a projection matrix $P_u = I - A_u^H(A_u A_u^H)^{-1} A_u;$ where $A_u = [a^H(\hat{\theta}_1), \ldots, a^H(\hat{\theta}_{u-1}), a^H(\hat{\theta}_{u+1}), \ldots, a^H(\hat{\theta}_U)]^H;$ projecting and normalizing a steering vector $$b_u(\theta) = \frac{a(\theta)P_u}{\|a(\theta)P_u\|};$$

computing $\lambda_u(\theta) = \|\tilde{Z}b_u^H(\theta)\|^2$, and updating $\hat{\theta}_u$; and, repeating the above steps until a stopping criteria is met.

27. The receiver of claim 22 wherein the channel estimation module uses a simplified projection algorithm to find:

$$\tilde{Z} = \begin{bmatrix} Z_0 & \cdots & Z_{P-1} \\ Z_P & \cdots & Z_{2P-1} \\ & \cdots & \\ Z_{(N-1)P} & \cdots & Z_{NP-1} \end{bmatrix}$$

where NP is less than a total number of allocated subcarriers M and P>U;

setting initial estimates $\hat{\theta}_u = \hat{\theta}_u^{(0)}$ for each multicarrier signal;

for each multicarrier signal, using a projection method to estimate $\hat{\theta}_u$, from the initial estimates, where the steering vector is given by:

$$b_u(\theta) = \frac{a(\theta)P_u}{\|a(\theta)P_u\|}; \text{ and,}$$

where $P_u = I - A_u^H(A_u A_u^H)^{-1} A_u;$ and, $A_u = [a^H(\hat{\theta}_1), \ldots, a^H(\hat{\theta}_{u-1}), a^H(\hat{\theta}_{u+1}), \ldots, a^H(\hat{\theta}_U)]^H.$ 28. The receiver of claim 15 wherein the channel estimation module applies the linear phase rotation and constant amplitude assumptions to every m-th subcarrier frequency, where m is an integer variable greater than, or equal to 2.

* * * * *